84-84 AU 211 EX
FTP6502 OR RE 10,279

3 Sheets—Sheet 1.

O. H. ARNO,

Assignor to the AMERICAN AUTOMATIC ORGAN COMPANY.

MECHANICAL MUSICAL INSTRUMENT.

No. 10,279. Reissued Jan. 30, 1883.

Witnesses:
R. B. Bellows.
Wm. S. Bellows.

OLIVER H. ARNO,
Inventor.
per Brown Bros.
Attorneys.

N. PETERS, Photo-Lithographer, Washington, D.C.

3 Sheets—Sheet 2.

O. H. ARNO,

Assignor to the AMERICAN AUTOMATIC ORGAN COMPANY.

MECHANICAL MUSICAL INSTRUMENT.

No. 10,279. Reissued Jan. 30, 1883.

Witnesses:
R. B. Billows
Wm. S. Billows

OLIVER H. ARNO,
Inventor,
per Brown Bros.
Attorneys.

N. PETERS, Photo-Lithographer, Washington, D.C.

O. H. ARNO, 3 Sheets—Sheet 3.

Assignor to the AMERICAN AUTOMATIC ORGAN COMPANY.

MECHANICAL MUSICAL INSTRUMENT.

No. 10,279. Reissued Jan. 30, 1883.

Witnesses:
R. B. Bellows
Wm. S. Bellows

OLIVER H. ARNO,
Inventor,
per Brown Bros.
Attorneys.

N. PETERS, Photo-Lithographer, Washington, D. C.

UNITED STATES PATENT OFFICE.

OLIVER H. ARNO, OF WILMINGTON, ASSIGNOR TO THE AMERICAN AUTOMATIC ORGAN COMPANY, OF BOSTON, MASSACHUSETTS.

MECHANICAL MUSICAL INSTRUMENT.

SPECIFICATION forming part of Reissued Letters Patent No. 10,279, dated January 30, 1883.

Original No. 239,213, dated March 22, 1881. Application for reissue filed January 20, 1882.

*To all whom it may concern:*

Be it known that I, OLIVER H. ARNO, a citizen of the United States, residing at Wilmington, in the county of Middlesex and State of Massachusetts, have invented certain new and useful Improvements in Mechanical Musical Instruments, of which the following is a specification.

This invention relates to improvements upon mechanical musical instruments, in which a perforated strip of paper caused to be moved through the instrument will, through suitable mechanism, operate valves, &c., of such instrument, by which reeds or other sounding devices will be sounded; and this invention more particularly is to be used in connection with a mechanical musical instrument constructed as shown and described in Letters Patent of the United States issued to me, dated May 18, 1880, and numbered 237,714, although it is applicable to other forms of such musical instruments.

The invention consists in a novel combination of devices, which are fully illustrated in the accompanying drawings, in which—

Figure 1:
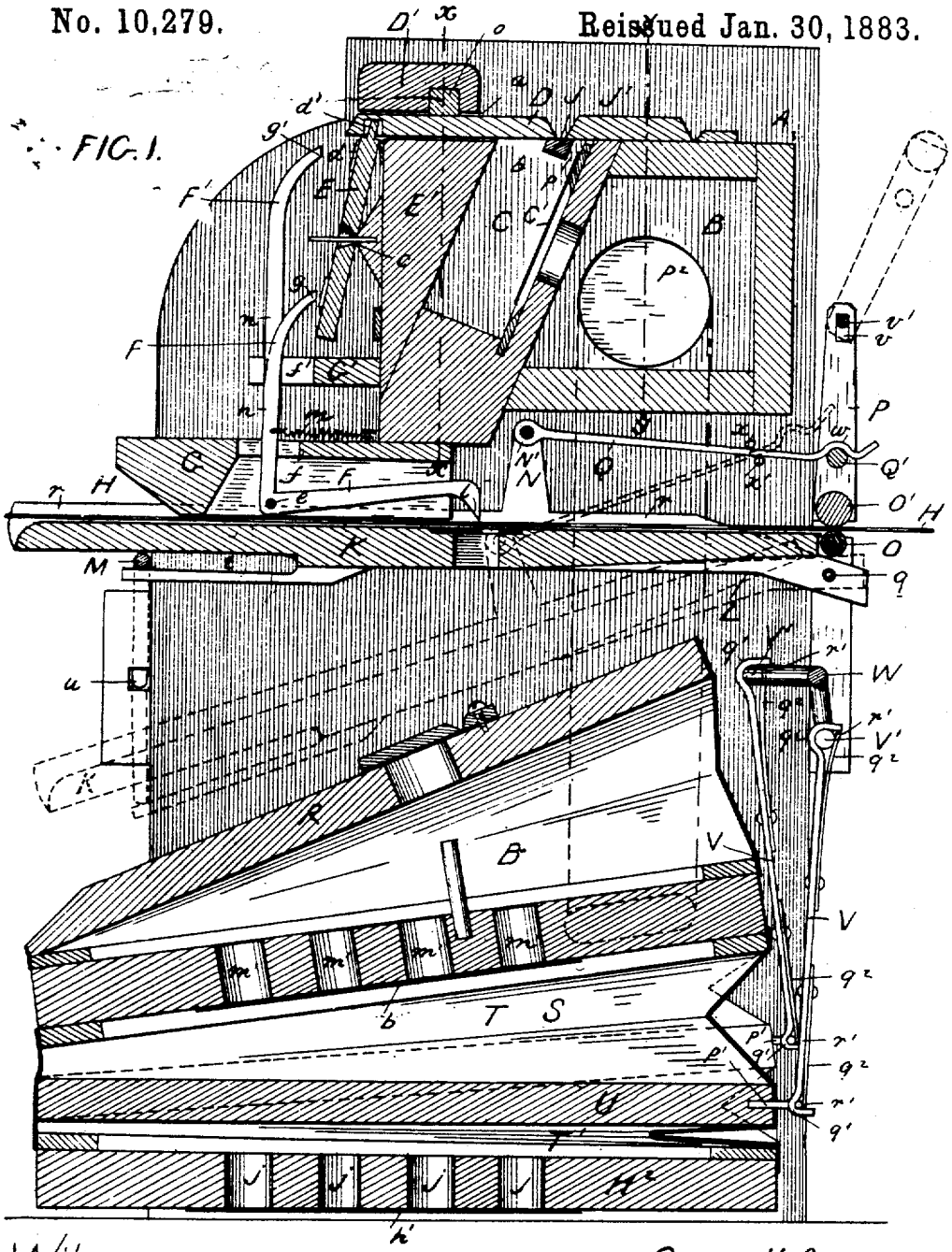
Figure 2:
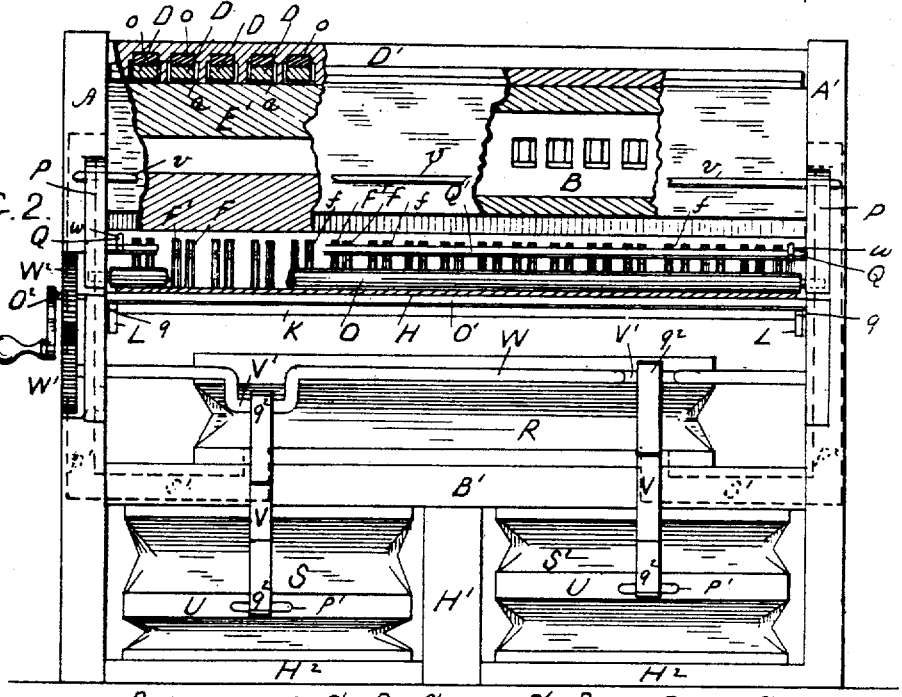
Figure 3:
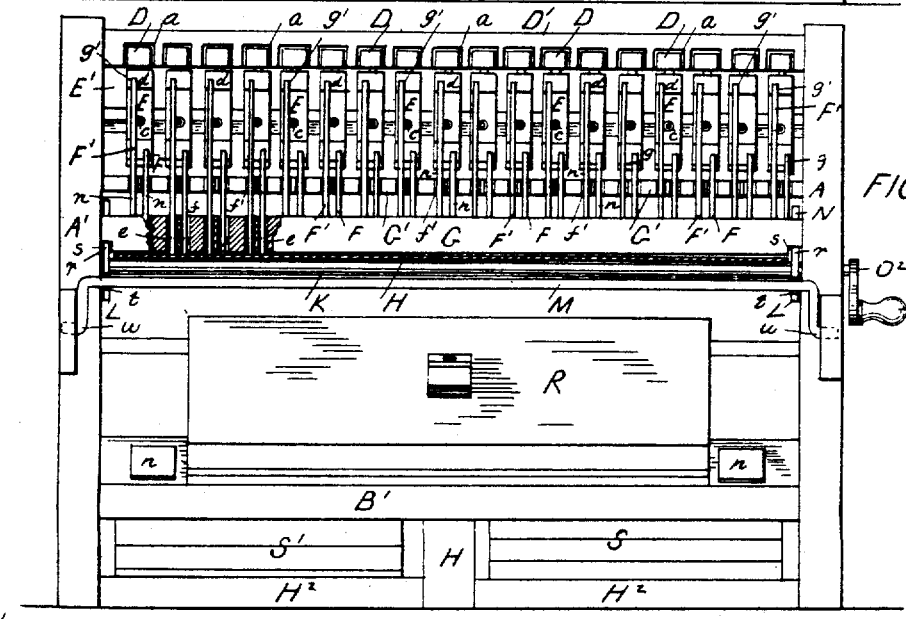
Figure 4:
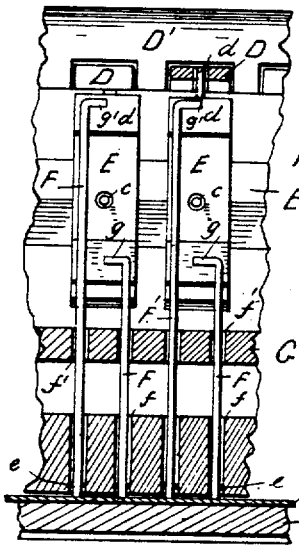
Figure 6:
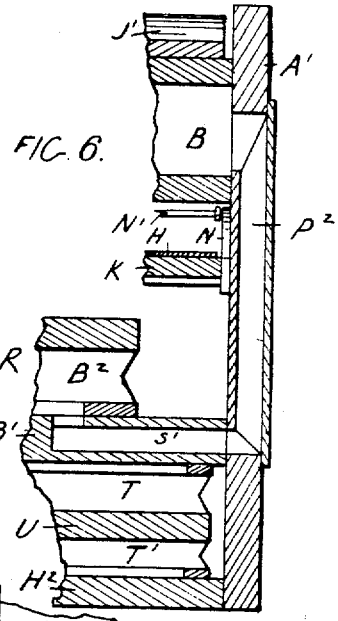
Figure 5:
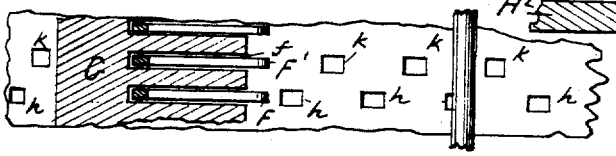
Figure 7:
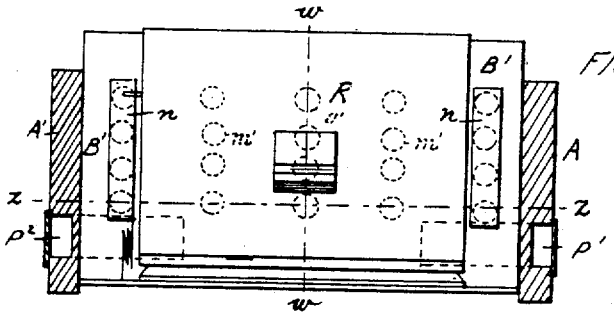
Figure 9:
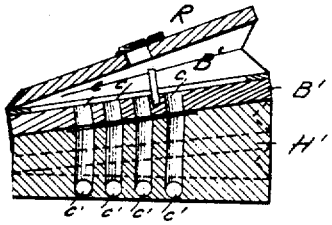
Figure 8:
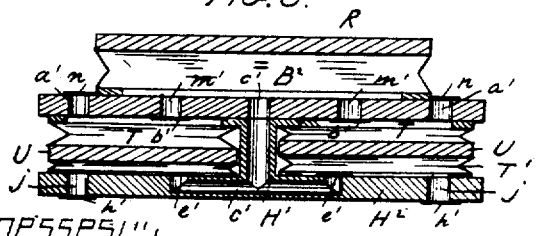
Figure 10:
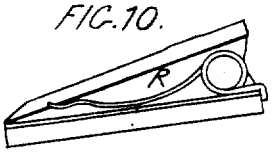

In Plate 1, Figure 1 is a vertical cross-section of a mechanical musical instrument constructed according to this invention. In Plate 2, Fig. 2 is a partial rear elevation and partial vertical sections on lines *x x* and *y y*, respectively, Fig. 1. Fig. 3 is a front elevation of the musical instrument, and in partial section. In Plate 3, Fig. 4 is a detail view in elevation; Fig. 5, a detail plan view of the perforated strip of paper and partial section of other parts; Fig. 6, a detached vertical sectional view of one of the air-conductors and its connection with the bellows and the wind-chest; Fig. 7, a plan view of the bellows with the framework in cross-section; Fig. 8, a longitudinal vertical section of the bellows and its exhausters on line *z z*, Fig. 7; Fig. 9, a vertical cross-section of the bellows on line *w w*, Fig. 7; and Fig. 10, an end view of the bellows.

In the drawings, A A′ represent upright end frames, on which are supported and carried the various parts making the musical instrument.

B is the wind-chest, extending from one frame to the other and secured thereto.

C is the reed-chamber to the reed C′, and D its valve. This valve D is arranged to slide horizontally in a groove, *a*, in the rail D′, back and forth over the opening *b*, to the reed-chamber C.

E is a lever, pivoted at *c* to the board E′, front of reed-chamber, on which pivot it tilts or swings vertically. The upper end, *d*, of this lever E engages with the front end of the valve D at *d*, so that swinging the lever back and forth on its fulcrum *c* correspondingly slides the valve D and opens and closes the reed-chamber C.

F and F′ are two L-shaped levers, pivoted at *e* in grooves *f* in the horizontal board G, adapted to swing in a vertical plane, their upright parts being guided in grooves *f′* in a rail, G′. These levers F and F′ in their movements act alternately by their upper ends, *g* and *g′*, on the tilting lever E, and through said tilting lever the valve D is caused to slide back and forth over the opening *b* of the reed-chamber C, and the movements of these levers F F′ to open and close the valve D through the tilting lever E are controlled for such operations by the perforated and unperforated portions of the paper strip H. This perforated strip of paper, H, is provided for each valve, with its two levers F and F′, with two parallel rows, *h* and *k*, of perforations, all of which perforations are of a uniform length, one, *h*, of which rows of perforations is for the opening of the valve D through the lever F, and the other, *k*, for closing the same valve through the lever F′, these rows of perforations being in line with the two levers F and F′. When one of the perforations in the row *h* of the strip of paper comes under the V-shaped projection *l* of the lever F, with which it is in line, the projection drops into the perforation, the lever F is swung by the pull of a spiral spring, *m*, attached to its arm *h*, such movement opening the valve through the tilting lever E, when the reed can sound, and as a perforation in the other row, *k*, comes under the V-shaped projection *l* of the other lever, F′, it drops into such perforation, and correspondingly closes the valve, each lever, after performing its work, at once returning to its normal position, the perforations being of a length only necessary to open or close the valve.

So far the several parts hereinabove described are substantially as shown and described in the Letters Patent above referred to, excepting they are arranged in different positions relatively to each other.

Inserted in the rail D′ above the valve D is a piece of felt, *o*, or other elastic material, which presses on the valve D to keep it to its seat over the reed-chamber.

A bar, J, divides the upper end of reed-chamber C into two openings, one, *b*, of which is closed by the valve D, and the other, *p*, by a board, J′, hinged to the top of the wind-chest B, and held firmly to its position over the opening *p*, in any suitable manner, so air will not enter into or escape from the reed-chamber C through such opening. This opening *p* is to enable the reed-chamber to be reached to remove or insert the reeds, the raising of the board J′ allowing of such operation.

K is the bed or raceway. This bed or raceway K is in a horizontal position and extends the width of the instrument from one frame to the other, to which it is pivoted by arms L at *q*. On this bed or raceway in the operation of the instrument travels and is guided the perforated strip of paper. The arms L extend along the bed K, and at the ends of the bed K, along its width, project a slight distance above the top surface of the bed, as at *r*, and lie in grooves *s* in the board G, to which the levers F and F′ are pivoted. At the front end of each of these arms L, under the bed K, is a horizontal slot, *t*, in which is arranged to move a crank arm or rod, M, extending across the width of the bed K and pivoted to the front of each frame A at *u*. The bed K, when in position for the operation of the instrument, by its front end rests on this crank arm or rod M. Swinging this crank-arm down carries with it, through the slot-connection *t*, the front end of the bed K into the position shown in dotted lines in Fig. 1. Swinging the crank up raises the bed or raceway to its horizontal position, where it is secured in any proper manner for the proper guidance of the perforated paper strip in its movements through the instrument.

N represents upright extensions of the arms L, which are connected together by rod N′.

O is the feed-roll, which, in connection with the roll O′, feeds the perforated paper strip through the instrument, the shaft of the feed-roll O being the driving-shaft and operated by the crank-arm $O^3$, or in any suitable manner, said shaft turning in bearings in the frames A A′, and the shaft of the upper roll, O′, in bearings in the vertical and independent frame P, hung by slots *v* to a rod, *v′*, extending from one frame A to the other. Two spring-arms, Q, hung to rod N′ of bed or raceway K, extend toward and, by their free ends *w*, which are of hook form, hook over and bear upon the rod Q′, to hold the vertical frame P to the proper position for the feed-roll O′ to bear upon the lower feed-roll, O, suitable pressure being given to the spring-arms Q by a pin, *x*, properly located for such purpose in the frames A and A′. The slots *v* in the frame allow of sufficient yielding movement to the feed-roller O′ as the paper strip is fed through the instrument. A pin, *x′*, under each spring-arm Q prevents its falling if the frame P is swung up and away from its connections. To insert the paper strip, swing down the bed K, as described, which carries with it the spring-arms Q, releasing their hold on the roller-frame P, which then can be swung up, all as shown in dotted lines in Fig. 1. The paper can then be placed in at the front of the instrument and moved back until its end is over the feed-roll O, the cross-rod N′, from its position when the bed is down in relation to the projections *l* of levers F F′, preventing any interference between the paper strip and said V-shaped projections of the levers. Then, swinging down the frame P and raising the bed K by its crank-arm M, the several parts are secured in place and the paper strip is in position for the operation of the instrument. By reversing these movements the paper strip can be removed.

R is the bellows, and S S′ its exhausters, which are constructed as usual, except, so far as relates to the present improvements thereon. These exhausters S and S′ are each made double—that is, each has an upper chamber, T, and a lower chamber, T′, separated by the moving or the usual lifting board, U, which is adapted to move up and down in the usual manner in exhausters for bellows. In this arrangement of the lifting board having a chamber above and below it, as shown, the lifting board U operates to exhaust the bellows through its downward as well as its upward movement, whereas, as heretofore, with an exhauster having only one chamber, the lifting board only operated to exhaust the bellows in one of its movements.

The operation of the exhausters to exhaust the bellows is as follows: As the lifting board moves up, the air in the upper chamber, T, is forced out through a series of openings, *a′*, in the end of the stationary board B′ over the exhauster, a valve, *b′*, preventing its escape through openings *m′* into the bellows-chamber $B^2$. At the same time air passes into the lower chamber, T′, from the bellows-chamber $B^2$, through a series of passages, *c′*, arranged in the middle upright board, H′, and bottom board, $H^2$, a valve, *e′*, in chamber T′ allowing such passage, and a valve, *h′*, over a series of openings, *j*, in board $H^2$ preventing air from the outside passing into the lower chamber, T′.

The downward movement of the lifting board forces the air in the lower chamber, T′, out through the series of openings *j* in the board $H^2$, the valve *e′* preventing air passing from chamber T′ through the passages *c′* to the bellows-chamber $B^2$. At the same time air is passing from the bellows-chamber $B^2$ through the series of openings *m′* in the board B′ into the upper chamber, T, the valve *n′*, over opening *a′* in the board B′, preventing air from entering the upper chamber, T, from the outside, and so on, each movement of the lifting board U, either up or down, serving, through the several connecting air-passages and openings, to properly exhaust the bellows. The operation of the other exhauster is similar.

Each lifting board U, at its end, is connected by a separate pitman-rod, V, to a separate crank-arm, V′, on a common shaft, W, which crank-arms project from such shaft at right angles to each other. The shaft W, to which the pitman-rods V are connected, has on its end a gear-wheel, W′, which engages in another gear-wheel, $W^2$, on the lower feed-roller shaft, $O^2$. Turning this driving-shaft $O^2$ revolves the feed-rollers, which draws the perforated strip through the instrument, operates the bellows through the pitman-rod connection to exhausters, and with the perforations in the paper strip properly arranged therefor a tune will be played by the instrument. The pitman-rods are connected to the shaft W and the staples $p'$ in lifting board U by a spring-joint for a ready attachment and detachment of the same. Each rod is in two parts, $q'$ and $q^2$, one, $q'$, of which is made in hook form to hook over the crank-arm V′ or staple $p'$, and the other part, $q^2$, which is a spring, bears by its free end $r'$ against said crank-arm V′ or staple $p'$ and holds its hook to its connection. Raise the spring from its bearing and the pitman-rod can be readily detached from its crank-arm or staple, and as readily attached thereto. With these double-acting lifting boards attached to the crank-arms V′, respectively, of shaft W, at right angles to each other, the bellows is exhausted at every quarter-turn of the shaft W, and to accomplish these results by exhausters with single-acting boards, as heretofore used, would require four exhausters with as many lifting boards, pitman-rods, and crank-arms. This double action of each lifting board U is important, as the exhausters can be made smaller, taking up less room in the instrument, besides operating with a less number of connecting pitman-rods, crank-arms, &c.

$P'$ and $P^2$ are air-passages arranged vertically within each frame A at each end of the instrument, their lower ends connecting by a passage, $s'$, in the stationary board B′ with the bellows-chamber $B^2$ and their upper ends with the wind-chest B. These air-passages $P'$ and $P^2$ are for the passage of air from the wind-chest to the bellows-chamber in the operation of the instrument.

In the construction of the instrument the several parts can be duplicated as desired for the compass of the instrument—that is, the valves, reeds, reed-chambers, levers to operate the valves, the various levers having their proper grooves and pivotal joints, and each valve its groove in the board, and its elastic cushion—and more exhausters can be added to the bellows.

Figs. 2 and 3 represent the front and rear elevation views of an instrument having a series of reeds, valves, levers, &c.

The frame A A′, with all the parts of the instrument herein shown and described, can be set in a casing surrounding the whole, which will protect the various parts from injury, and which can be ornamented exteriorly as desired, openings being left for the perforated sheet of paper to pass through the instrument and for the proper turning of the driving-shaft.

Locating the operating mechanism of the instrument, as described, on one side of the perforated paper strip enables all the parts to be easily reached for repairs, or for any purpose desired, without disturbing the rest of the instrument, making the same more compact.

The bed or raceway can be arranged to have its rear end swung down instead of its front end, but as described is preferable.

Turning the crank-arm M in the proper direction by and through its connections with the roll O′ serves to remove and release such roll from its contact with and pressure upon the feed-roll O, and also releases and separates the fingers or levers F F′ from contact with the perforated strip by widening the space between the fingers and the bed or raceway, whereby the music sheet or strip can be inserted in and removed from the instrument, as desired, and can be moved in a reverse direction through the instrument without interfering with the fingers or levers.

Connecting the two shafts O and W by gears, as shown, obviates the necessity of crank-arms on the ends of the shafts outside of the casing, the projection of which is objectionable, as they are liable to be bent or injured, while the gear-wheels can be arranged flush within the casing, as shown, or located inside the same, as is obvious, giving a neater appearance to the casing.

Having thus described my invention, what I claim, and desire to secure by Letters Patent, is—

1. In a mechanical musical instrument adapted to be operated by a traveling perforated music-sheet, the combination of a bellows, the mechanism for operating the valves of the reed-chamber, arranged above said bellows and separated therefrom by an intervening space, and a bed or raceway for the music-sheet, arranged intermediate the bellows and the reed-chamber, and pivoted or hinged at one end, whereby it may swing downward through the space between the bellows and reed-chamber, all substantially as and for the purpose described.

2. In a mechanical musical instrument, the combination, with the presser-roll O′, of the spring-arms Q, actuated through suitable connecting means by crank-arms M, substantially as and for the purpose specified.

3. In a mechanical musical instrument, the combination, with the feed-roll O′, of the spring-arms Q, pivoted to the bed K and operated by means of crank-arm M, all substantially as and for the purpose specified.

4. In a mechanical musical instrument adapted to be operated by a perforated sheet of material, a bed or raceway for said sheet, arranged below the reed and valve chambers of the instrument and hinged or pivoted at one end, substantially as described, whereby it may be swung downward from the reed and valve chambers independent of the bellows for the ready introduction of the music-sheet, as set forth.

5. In a mechanical musical instrument, the combination, with a bed or raceway for perforated music-sheet, pivoted or hinged at one end to the frame of the instrument, and provided at the other end with a slot or slots, *t*, of a swinging crank, M, for engaging and disengaging said slot or slots, substantially as and for the purpose described.

6. In a mechanical musical instrument, a bed or raceway on which a perforated sheet of paper travels, hung to the frame A A′ and arranged to be swung down at one end, the cross-rod N′ being attached thereto, substantially as and for the purpose specified.

7. In a mechanical musical instrument, the combination, with the feed-roller O, of a frame, P, provided at its lower end with the feed-roller O′, and having at its upper end the elongated slots *v*, through which passes a rod, *v′*, rigidly connected to the frame of the instrument, said frame being capable of swinging outward and upward on the rod *v′*, substantially as and for the purpose described.

8. In a mechanical musical instrument, the combination, with the frame P, provided at its lower end with a feed-roller and at its upper end with a slot, *v*, through which passes a rod, *v′*, rigidly attached to the frame of the instrument, of the spring-arms Q, constructed to engage said frame P when in its normal vertical position, substantially as shown and described.

9. In a mechanical musical instrument, in combination with a bed or raceway on which a perforated strip of paper travels, hung to frame A A′ and arranged to be swung down, the spring-arms Q, hung thereto and arranged to bear upon the frame P, carrying the feed-roller O′, by the pin *x′*, all substantially as and for the purpose specified.

10. In a mechanical musical instrument, the combination, with the wind-chest and the bellows, of an air-passage forming a communication between the bellows and the wind-chest, outside of and around the bed or raceway of the perforated sheet, as herein shown and described.

11. In a mechanical musical instrument, the combination, with the wind-chest and the bellows, of the air-passages $p'$ $p^2$, forming communications between the bellows and the wind-chest, which extend outside of and around the bed or raceway of the perforated sheet, as herein shown and described.

12. The combination, with the bellows and the crank-shaft, of the pitman-rods, having one or both ends made with a hook end, *g′*, and spring-arm $g^2$, substantially as and for the purpose described.

13. The rail D′, having one or more grooves, *o*, in combination with the slide-valves, arranged to operate substantially as shown and described.

14. In combination with a sliding valve, D, the elastic material *o*, arranged substantially as and for the purpose described.

15. In a mechanical musical instrument, the combination, with the two feed-rolls, a perforated music-sheet, and actuating fingers or levers, of a crank-arm arranged to turn and in such turning to release one of the said rolls from the spring-arm Q, whereby the roll may be moved to or from the other roll, and at the same time release or separate the actuating fingers or levers from the perforated music-sheet, so that the music-sheet can be freely removed from or inserted in the instrument or moved in a reverse direction.

In testimony whereof I have hereunto set my hand in the presence of two subscribing witnesses.

OLIVER H. ARNO.

Witnesses:
EDWIN W. BROWN,
WM. S. BELLOWS.